United States Patent Office 2,915,494
Patented Dec. 1, 1959

2,915,494

LOW TEMPERATURE CURING 1,3-DIENE CONTAINING ELASTOMERS AND METHOD OF MAKING SAME

William J. Snoddon, Ramsey County, Minn., assignor to Minnesota Mining and Manufacturing Company, St. Paul, Minn., a corporation of Delaware No Drawing. Application December 3, 1956
Serial No. 625,591

12 Claims. (Cl. 260—45.5)

The present invention relates to elastomers. More particularly the present invention relates to room temperature curing elastomers prepared from low molecular weight semi-liquid polymers combined with certain polyfunctional acid materials, and to the method of their preparation.

It is an object of the invention to provide initially semi-liquid materials which cure slowly and spontaneously at room temperature to solid, flexible, solvent-resistant elastomers without the production of objectionable by-products or the necessity to guard against the too rapid evolution of heat.

Another object of the invention is to provide semi-liquid elastomers which firmly adhere to surfaces with which they are in contact during curing, and which remain firmly adhered to such surfaces after curing to a solid state.

A further object of the invention is to provide solid elastomers which are highly resistant to attack by oils and solvents.

It is yet another object of the invention to provide a method of combining the semi-liquid polymers and acid materials in the production of useful solid, flexible, solvent-resistant elastomers.

This invention is based on my discovery that certain strong polyfunctional acid materials are capable of spontaneously curing or hardening epoxidized low molecular weight semi-liquid diene polymers to a solid state.

By "semi-liquid" as used herein is meant that the material is capable of flowing and possesses a viscosity in the range of about 20 to about 45,000 poises. Since materials in the upper regions of this viscosity range may require warming or dilution with solvents for convenience of handling and the like, the term "semi-liquid" is intended only to be descriptive of the physical character of the material with respect to gross behavior.

The preferred procedure for producing the elastomers of this invention is to combine, in proportions more fully hereinafter set forth, an epoxidized low molecular weight semi-liquid diene polymer and an unepoxidized low molecular weight semi-liquid diene polymer into which the polyfunctional acid material has been previously dispersed or dissolved.

Initially the combined ingredients constitute a semi-liquid mass capable of being introduced into cavities by pouring through small openings, the mass spontaneously curing in situ to a solid, resilient, solvent-resistant elastomer firmly adherent to the cavity walls with which the elastomer was in contact during curing. This combination of features enables these elastomers to be advantageously employed in sealing the spaces between plates of aircraft and, in a more general application, to join plates to one another during assembly thereof whereby the elastomers, upon curing, serve both as gaskets and sealing means.

These elastomers are also useful for sealing pipe line joints for natural gas lines, particularly where odorants which attack conventional polysulfide rubbers have been added to the gas, as well as in caulking or glazing applications. They are particularly valuable, of course, in all those applications where the use of heat and the production of objectionable by-products are to be avoided.

Suitable epoxidized semi-liquid low molecular weight polymers are obtained by oxidation of low molecular weight elastomeric polymers of 1,3-dienes with hydrogen peroxide in the presence of formic acid. The starting 1,3-diene polymer may be a homopolymer, e.g. polybutadiene, degraded rubber, etc. or a copolymer of a 1,3-diene and up to 50% by weight of a vinylic compound such as styrene, acrylonitrile, acrylic acid, an acrylate ester, methyl vinyl pyridine, or other wherein the sole aliphatic unsaturation is present in vinyl groups. The vinylic compound may also be characterized as a monoethylenically unsaturated comonomer wherein the sole aliphatic carbon to carbon unsaturation is present in a vinyl group. The oxidation reaction converts a portion of the residual double bonds in the polymer to epoxy, or oxirane, groups:

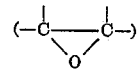

These epoxidized polymeric materials are distinguished from the more generally known epoxy resins in that they possess no oxygen atoms in the backbone of the polymer molecule whereas epoxy resins are commonly derived from glycidyl ethers and possess numerous oxygen atoms in the backbone. The amount of oxirane oxygen in the polymer should be in the range of 0.4 to 7% based on the weight of the epoxidized polymer. The preferable range is from about 3.5 to 5.5%.

The unepoxidized polymer component of the low molecular weight semi-liquid diene polymer and polyfunctional acid mixture with which the epoxidized polymer is combined is also a 1,3-diene polymer as defined in the preceding paragraph and may be identical to or different from the epoxidized component in any given elastomer. Thus, for example, the epoxidized component may be degraded rubber and the unepoxidized component either degraded rubber or some other 1,3-diene polymer.

The polyfunctional acid materials useful for mixture with the unepoxidized semi-liquid diene polymer in the preparation of the room temperature curing products of the invention are those strong non-oxidizing polyfunctional acids having dissociation constants for the first hydrogen of about $10^{-2}$ or greater, and acid anhydrides, and soluble acid esters thereof. Among such acid materials are oxalic acid, maleic acid, maleic anhydride, chloromaleic anhydride, dichloromaleic anhydride, pyromellitic dianhydride, butane-1,2,3,4-tetracarboxylic dianhydride, alpha sulfopalmitic acid, naphthalene disulfonic acid, phosphoric acid, methyl dihydrogen orthophosphate, ethyl dihydrogen ortho-phosphate and n-butyl dihydrogen ortho-phosphate.

The acid material is mixed with the unepoxidized polymer by adding the acid material to the polymer, then heating the mixture at a temperature of from 25 to about 175° C., and preferably from about 80 to about 130° C., one-half to four hours or until such time as the acid material is dispersed relatively evenly throughout the polymer. Prolonged heating of the mixture has a deleterious effect in that such a mixture when combined with the epoxidized polymer gives a product which remains in a semi-liquid state indefinitely and does not cure to a solid elastomer. Too much or too little acid material results in products which do not spontaneously cure to solid elastomers but which either cure to brittleness or remain in a semi-liquid state. Suitable amounts of acid material, based on parts by weight of acid material to unepoxidized polymer, have been found to range from 5 to 50 parts and preferably around 20 parts per 100 parts unepoxidized polymer.

The acid material-unepoxidized polymer mixture component is combined with the epoxidized polymer component in the approximate ratio in parts by weight of one part mixture component to 1–4 parts epoxidized polymer in order to provide a product which spontaneously changes, or cures, at room temperature from a semi-liquid mass to a solid, rubbery, solvent-resistant elastomer. No special conditions are necessary in combining the components other than thorough mixing and they may be simply mixed together at room temperature.

The solid elastomers, in the absence of coloring additives, are generally amber colored and form tough, firm-bodied rubberlike sheets and films possessing excellent flexibility and impact resistance, fair elongation, and good resistance to hydrocarbon solvents, but relatively low tear resistance. They adhere firmly to most structural materials, particularly metal and glass, and form excellent sound dampening seals even between relatively movable structural parts, making them particularly useful in the automobile and aircraft industries.

In order to prevent surface cracking upon aging of the cured elastomer, it is desirable to add a minor proportion of an antioxidant of the type conventionally used to inhibit air aging of rubber to the semi-liquid elastomeric mixture. Among these conventionally used antioxidants are various aromatic amines, phenols and quinones such as phenyl-beta-naphthylamine, diphenyl ethylene diamine, hydroquinone monobenzyl ether, and alkylated polyhydroxy phenols. Based on the weight of the unepoxidized polymer, the preferred amount of antioxidant may range from about 2 to about 10 parts per 100 parts of unepoxidized polymer. When the antioxidant is used in amounts less than 2 parts per 100, surface cracking on aging of the cured elastomer is insufficiently inhibited. When the antioxidant is used in excess of 10 parts per 100, the semi-liquid elastomer cures to a tacky, gummy product or, if the excess is sufficiently great (i.e. about 20 parts per 100), does not cure at all. The permanently tacky, gummy product is in itself, however, a useful adhesive and has been used to join metal parts to one another.

In general, these elastomers cure to a solid state or gel in from 24 to 48 hours, and continue to cure thereafter to a tougher product for a period of about two weeks. If desired the gel and subsequent curing times can be accelerated to less than one hour by heating the mass and by other means which will appear hereinafter.

The principles of the invention are further illustrated in the specific examples which follow. The first example is illustrative of the manner in which a semi-liquid diene polymer is epoxidized. The succeeding examples are directed to the preparation and properties of the elastomers of this invention.

*Example 1*

In a 500 ml. three-necked flask, equipped with mechanical stirrer, dropping funnel, reflux condenser and thermometer suspended through the condenser, were placed 108 grams (2 equivalents) of liquid polybutadiene, 13 grams (0.27 mole) of formic acid and 60 ml. of carbon tetrachloride. With stirring, 90 grams (0.9 mole) of 35% hydrogen peroxide was added gradually over a period of about 35 minutes during which time the temperature of the contents of the flask rose from 23 to 30° C. The temperature subsequently rose slowly to 40° C. and after five hours declined to 37° C. Sufficient heat was applied to maintain the temperature between 37 and 40° C. for a further three hours, giving a total reaction time of eight hours. The mixture was washed with four successive 100 ml. portions of water by stirring and decantation. The carbon tetrachloride was removed by steam-distillation, residual water decanted and the epoxidized polybutadiene composing the product dried by application of vacuum. The product was a very viscous semi-liquid material. Analysis showed that it contained 4.6% oxirane oxygen. This value varied considerably from batch to batch as well as with different epoxidized polymers. This example illustrates the general method employed for making epoxidized polymers which are used as the first components in the practice of this invention. The following examples are directed to the preparation and properties of the elastomers of the invention. Unless otherwise noted, parts and percents are by weight.

*Example 2*

To a 500 ml. two-necked flask, equipped with mechanical stirrer, reflux condenser and thermometer suspended through the condenser, were added 200 grams of a low molecular weight liquid 75:25 butadiene:styrene rubber and 50 grams dichloromaleic anhydride. The mixture was agitated, and the temperature was raised to 130° C. and held at about that point for approximately four hours.

The product, a freeflowing liquid at room temperature, was mixed at room temperature with epoxidized low molecular weight liquid 75:25 butadiene:styrene copolymer containing about 4.3% oxirane oxygen in the ratio of 60 parts of the anhydride-copolymer product to 100 parts by weight of the epoxidized copolymer. After 24 hours at room temperature, a weak, solid, tacky rubbery product was obtained which on further curing at room temperature for one week developed fair tensile strength, good stretchability and was tack-free, but which displayed rather low tear resistance.

A casting prepared similarly using 3 parts of epoxidized polybutadiene to one part of the adduct of 17% dichloromaleic anhydride and 83% liquid polybutadiene and cured for about 15 days at room temperature was tested for oil resistance by ASTM Procedure D–471–49T, Method B. The following volume swells were noted in:

| | Percent |
|---|---|
| 70:30 iso-octane:toluene mixture | 86 |
| Benzene | 154 |
| Acetone | 76 |
| Iso-octane | 52 |

After 72 hours at 100° C. in ASTM #1 oil, a 2% volume swell was realized.

These values indicate that the material has an oil resistance in the range of that of neoprene or low acrylonitrile content Buna-N rubber and is better than many rubbers commercially used for such purposes. This property is of value in applications where a sealant may be exposed to attack by oils, as, for example, in pressure-sealing airplane fuselages, etc.

These and similar compositions have been used to encapsulate a number of articles including metals and glass and have proved to be capable of withstanding the stresses which occur due to differences in expansion or contraction of the various materials without loss of adherence to the materials. These compositions also show considerable utility as casting materials for use in casting intricately shaped rubbery objects at room or slightly elevated temperatures and as sealants for aircraft, automotive, marine and electrical applications.

In the foregoing example, the polymers employed in making both components were the same. A similar composition in which 60 parts of epoxidized polybutadiene:styrene containing about 4.3% oxirane oxygen was reacted with 40 parts of the reaction product of 17 parts dichloromaleic anhydride with 83 parts of low molecular weight polybutadiene:styrene, was compared with the same composition containing 30 parts by weight of "Furnex SRF" beads (a form of carbon black available from R. T. Vanderbilt Co.) after curing at room temperature for about one week.

Rubbers of this class containing carbon black were less subject to swelling by the solvents used in the ASTM procedure described hereinbefore and showed less elongation in percent, but a greater tensile strength.

Example 3

A mixture of 87% of a liquid low molecular weight 75:25 butadiene:styrene rubber and 13% pyromellitic dianhydride was heated for one hour at 120° C. by the procedure of Example 2. This component was added to a Baker-Perkins mixer with 30 parts "P-33" (a carbon black prepared by the thermal process and supplied by the R. T. Vanderbilt Co.) per 100 parts by weight of the butadiene:styrene rubber followed by the addition of 4 parts "Bakelite 10683" (liquid phenolic resin comprising the liquid condensation product of 1 mole of phenol or meta-cresol and from 0.5 to 2.0 moles of formaldehyde) and 2 parts "AgeRite Stalite" (an antioxidant comprising a heptylated diphenylamine supplied by the R. T. Vanderbilt Co.).

A second component was prepared comprising 100 parts epoxidized low molecular weight butadiene:styrene rubber containing 3.2% oxirane oxygen, based on a solid content of 99.3% solids material, diluted with 40 parts di(ethylhexyl) sebacate to make it more liquid after being mixed with 30 parts "P-33" carbon black, followed by the addition of 4 parts "Bakelite 10683" phenolic resin, and 2 parts "AgeRite Stalite." The first and second components were mixed in a ratio of equal parts by weight and also in a ratio of one part of the first composition to two parts of the second component. The mixed components were permitted to cure at room temperature for two weeks. The cured products were tested for solvent resistance, as evidenced by percent swelling by ASTM Procedure D-471-49T, Method B. The numerical values of the table following, representing the results of the aforementioned ASTM procedure are the swelling increases of the elastomers in percentage of increased volume.

| Solvent | Ratio of Components | | Temperature and Time |
|---|---|---|---|
| | 1:1 | 1:2 | |
| 70:30 Isooctane:toluene | 41 | 56 | 48 hrs. at 77° F. (25° C.). |
| acetone | 37 | 28 | Do. |
| ASTM #3 oil | 15 | 32 | 70 hrs. at 212° F. |
| water | 7 | 32 | Do. |

Tensile strength and elongation values were determined by stretching the elastomers on an Instron Tester, a machine comprising opposing jaws, one of which is movable toward and away from the other. Data obtained were as follows:

| | Ratio of Components | |
|---|---|---|
| | 1:1 | 1:2 |
| I. Immediately following two week cure: | | |
| Tensile Strength (p.s.i.) | 82 | 81 |
| Elongation (percent) | 50 | 50 |
| II. Two week cure plus 70 hrs. at 250° F. (120° C.) in air (ASTM D573-53): | | |
| Weight Loss (percent) | 3.5 | 3.9 |
| Tensile Strength (p.s.i.) | 328 | 250 |
| Elongation (percent) | 10 | 15 |

For the 1:1 ratio of compositions the Gehman torsional stiffness test (ASTM Procedure D-1053-54T) gave $T_{10} = -28°$ C., $T_{100} = -38°$ C. and Scott brittleness test (ASTM D-746-54T) gave $T_B = -53°$ C. For the 1:2 ratio corresponding values were $-40°$ C., $-47°$ C. and $-55°$ C. $T_{10}$ and $T_{100}$ respectively represent the temperatures at which the torsional stiffnesses are 10 times and 100 times as great as the torsional stiffness at normal room temperature (25° C.). $T_B$ represents the brittleness temperature of the elastomer.

The addition of sufficient antioxidant results in retention of some elongation even after aging the cured elastomer 70 hours at 250° F. as described above. This aging test is rather severe for elastomers comprising dienes. Lacking this additive, similar compositions based on liquid polybutadiene tended to form, even at room temperature, brittle surface films which cracked on aging.

The phenolic resin was added to increase adhesion of the cured elastomer to aluminum. Other adhesion promoting additives which were found desirable were diisocyanates and furfuryl alcohol. In several instances as much as a tenfold increase in adhesion resulted from the use of these additives when adhesion was measured as the force in pounds per inch of width necessary to cause separation of the elastomer and metal at a 90° angle in an Instron tester using two inches per minute jaw movement.

Example 4

An elastomer was prepared essentially as in the foregoing example; however, the epoxidized component, containing 5.47% oxirane oxygen on the solids basis, was prepared from a low molecular weight 60:50 butadiene:acrylonitrile copolymer and the acid material-polymer component was prepared by heating 200 grams of the same copolymer (unepoxidized), for one hour at 120° C. with 40 grams chloromaleic anhydride. The two components were mixed in a 2:1 ratio. The viscosity of the epoxidized component was about 45,000 poises. This mixture was too viscous to cast directly and was diluted to 85% solids with methyl ethyl ketone. After about two weeks, the cured product exhibited low strength but good elongation, and good air aging properties at 250° F. Resistance to oils and nonpolar solvents was excellent; however, the resistance of the cured material to acetone was poor. Similar products were obtained using component ratios of 1:1 and 3:1.

Example 5

A similar acid material-polymer component was prepared essentially by the method of the preceding example from 400 grams of a low molecular weight copolymer of 75:25 butadiene:styrene and 80 grams of 1,4,5,6,7,7-hexachlorobicyclo-(2,2,1)-5-heptene-2,3-dicarboxylic anhydride. This material was then mixed at room temperature with an equal amount of an epoxidized low molecular weight, liquid copolymer of 75:25 butadiene:styrene containing about 5.1% oxirane oxygen based on a solids content of 96.7%. On standing for several days at room temperature, a firm, tack-free rubbery product was obtained exhibiting properties similar to those set forth for the product of Example 2.

Example 6

An acid material-polymer component was prepared essentially as in Example 4 by heating 102.8 grams of a low molecular weight copolymer of 90% butadiene and 10% acrylic acid with 20 grams of chloromaleic anhydride. This reaction product was mixed at room temperature with an approximately equal weight of the epoxidized low molecular weight liquid 75:25 butadiene:styrene copolymer employed in Example 4.

A solid but tacky rubbery product was obtained at room temperature in 24 hours, curing further after several days to have properties similar to those of Example 2, but exhibiting the property of slight surface tackiness.

Example 7

An acid material-polymer component was prepared by heating about 80 grams of a low molecular weight 75:25 butadiene:styrene copolymer containing about 93% solids with 15 grams of dichloromaleic acid for one hour at 100° C. in a two-necked flask fitted with thermometer, reflux condenser and an electrically driven stirrer. After cooling to room temperature, the viscous reaction product was combined with an epoxided 75:25 butadiene: styrene copolymer containing 5.1% oxirane oxygen in proportions of 1:2 and 1:1. Within a few days, the former proportion showed somewhat greater curing, but in each case after about a week, the material was sufficiently rigid to be useful as a sealant.

*Example 8*

An acid material-polymer component was formed by heating 15 grams pyromellitic dianhydride and 75 grams "Liquid Philprene VP-25 Polymer" (a copolymer of 75% butadiene and 25% methyl vinyl pyridine submitted by Phillips Petroleum Co.) at 50° C. for 30 minutes—longer heating resulted in loss of fluidity. When combined with the epoxidized butadiene:styrene, containing 5.1% oxirane oxygen, of Example 6, in both 1:1 and 1:2 proportions and allowed to stand, similarly valuable rubbery products to those of Example 6 were obtained.

A similar material was obtained when 6 grams of the acid material-polymer adduct was combined with 12 grams of epoxidized low molecular weight polybutadiene containing about 3.8% oxirane oxygen.

Analogous results were obtained when pyromellitic dianhydride was heated with a 93% solids low molecular weight butadiene:styrene copolymer in the above proportions for one hour at 120°, one hour at 150°, or for 5½ hours at 150° C. These products, when combined with epoxidized polymers in a 1:2 ratio, and allowed to cure, yielded useful elastomers differing somewhat in their ultimate properties from those recited above.

*Example 9*

An acid material-polymer component was prepared from 50 grams depolymerized natural rubber (a product of DPR, Inc., a subsidiary of the H. V. Hardman Co. Inc.) and 10 grams of chloromaleic anhydride, by heating together as above for one hour at 120° C. The same depolymerized natural rubber was also epoxidized to give an epoxidized material containing 3.3% oxirane oxygen. A combination of 6 grams of the acid material-polymer component, 12 grams epoxidized depolymerized natural rubber and 3 grams methyl ethyl ketone was cast in a form on a sheet of polytetrafluoroethylene. After standing for one week at room temperature, a partial cure had occurred but the material remained rather tacky.

A similar combination was prepared in which 6 grams of the product from heating pyromellitic dianhydride and "Liquid Philprene VP-25 Polymer" together replaced that of the depolymerized natural rubber and chloromaleic anhydride. It cured slowly, but somewhat more rapidly than that above and could be removed from the polytetrafluoroethylene liner at the end of a week.

*Example 10*

"Liquid Philprene VP-25 Polymer," was epoxidized to give a viscous product containing 0.4% oxirane oxygen. A further 75 grams of the same copolymer was heated for 30 minutes at 50° C. with 15 grams of pyromellitic dianhydride to form a second component. These two components were combined in the ratio of three parts by weight of the epoxidized component to one part by weight of the unepoxidized component and poured into a shallow mold with a polytetrafluoroethylene liner to avoid adhesion to the mold. On standing for three days at room temperature, a firm, rubbery, slightly tacky product was obtained exhibiting properties similar to those set forth in the previous examples.

*Example 11*

A mixture of 83% liquid polybutadiene and 17% ethyl dihydrogen ortho-phosphate was heated for one hour at 70° C. by the procedure of Example 2. A mixture of 50 parts of this composition and 100 parts epoxidized liquid polybutadiene containing 3.8% oxirane oxygen based on a solids content of 94.3% solids material and also containing 2% "AgeRite Stalite" was cured at room temperature without further addition of plasticizers or solvents. After 24 hours a solid, rubbery product was obtained exhibiting properties similar to those of Example 2.

The preferred polyfunctional acid materials are the polycarboylic acid anhydrides, and particularly chloromaleic anhydride and pyromellitic dianhydride. Chloromaleic anhydride being liquid mixes quite easily with the unepoxdized polymer and gives a fairly rapid room temperature cure, which factors offset its somewhat objectionable odor. While pyromellitic dianhydride is a solid necessitating considerable mixing for even dispersion within the body of the unepoxidized polymer, the material is odorless and also gives a relatively fast cure.

The ortho-phosphoric acid and its ester derivatives give the most rapid cures; however, they adversely affect the water resistance of the resulting elastomers and for this reason are generally not used alone.

A good balance is obtained between rapid room temperature curing and good water resistance by combining a major portion of carboxylic acid material with a minor portion of phosphoric acid or an ester derivative thereof with the unepoxidized polymer. Thus, excellent results are obtained when the polyfunctional acid material is composed of a mixture of 17 parts chloromaleic anhydride to 1–3 parts phosphoric acid or ester thereof.

Heat greatly accelerates the curing time. For example, the semi-liquid mass of Example 3 when heated to 120° C. cured in approximately 15 minutes to a solid product.

Surprisingly the inclusion of amine type accelerators such as those used to accelerate the curing of conventional epoxy systems (i.e., triethylene tetramine, triethanol amine, alpha-methylbenzyl dimethyl amine, etc.) tend to inhibit room temperature curing completely when used in any substantial quantity, i.e., over 10% by weight of the elastomer, and to inhibit the rate of room temperature curing when used in smaller amounts.

In accordance with the teachings of this invention it is possible to obtain room temperature cured elastomers simply by mixing the strong polyfunctional acid material of the type described with the epoxidized low molecular weight, 1,3-diene polymer. This procedure is typified by the example following.

*Example 12*

To 100 parts of epoxidized low molecular weight GR–S rubber (butadiene-styrene) possessing 4.3% oxirane oxygen, was added 30 parts of chloromaleic anhydride at room temperature with continuous stirring. The resulting composition after curing for one week at room temperature showed a hardness reading of 60 on the Shore Durometer A scale. Further compositions were prepared wherein 10, 20, 40 and 50 parts of chloromaleic anhydride were each combined with 100 parts epoxidized GR–S rubber containing 4.3% oxirane oxygen. After room temperature curing for one week the compositions all showed a hardness reading of 60 on the Shore Durometer A scale. Longer aging gave progressively harder products which finally stabilized somewhere intermediate between an elastomer and a hard resin. These products, although not truly elastomeric, do have numerous useful sealing applications.

By way of contrast, a room temperature cured elastomer of 100 parts epoxidized low molecular weight GR–S containing 3.2% oxirane oxygen combined with 50 parts of a 5:1 reaction mixture of low molecular weight unepoxidized GR–S and chloromaleic anhydride gave a hardness reading on the Shore Durometer A scale of 25 after four months aging.

No single recipe can be given to satisfy the various elastomeric systems possible with this invention. However, certain generalities are possible. Of the available polymers, polybutadiene and polybutadiene:styrene combinations appear to provide the best cured elastomers. The most satisfactory cure ratio of epoxidized polybutadiene to unepoxidized polybutadiene acid material has been found to be about 2 to 1, whereas the most satisfactory cure ratio of epoxidized polybutadiene to polybutadiene:styrene adduct appears to be about 1 to 1.

What is claimed as new is as follows:

1. A semi-liquid elastomer, having a room temperature viscosity in the range of from about 20 to about 45,000 poises, capable of spontaneously curing at room temperature to a solid, rubbery, solvent resistant state, said elastomer comprising in parts by weight (1), from about 1 to about 4 parts of an epoxidized semi-liquid 1,3-diene homopolymer having about 0.4 to 7 weight percent oxirane oxygen, and (2), about 1 part of a mixture of about 10 parts by weight of a semi-liquid 1,3-diene homopolymer and from about 1 to 5 parts by weight of a strong non-oxidizing polyfunctional acid material selected from the group consisting of those non-oxidizing polybasic acids having a minimum dissociation constant for the first hydrogen of at least about $10^{-2}$, the anhydrides, and soluble esters of such acids.

2. A semi-liquid elastomer, having a room temperature viscosity in the range of from about 20 to about 45,000 poises, capable of spontaneously curing at room temperature to a solid, rubbery, solvent resistant state, said elastomer comprising in parts by weight (1), a first component of an epoxidized semi-liquid 1,3-diene polymer selected from the group consisting of a homopolymer of a 1,3-diene and a copolymer of a 1,3-diene and up to 50% by weight of a monoethylenically unsaturated comonomer having its sole aliphatic carbon to carbon unsaturation present in a vinyl group, said epoxidized polymer having about 0.4 to 7 weight percent oxirane oxygen, and (2), about 1 part of a second component of the mixture of about 10 parts of an unepoxidized semi-liquid 1,3-diene polymer as defined hereinbefore and from about 1 to 5 parts of a strong, non-oxidizing polyfunctional acid material selected from the group consisting of those non-oxidizing polybasic acids having a minimum dissociation constant for the first hydrogen of at least about $10^{-2}$, the anhydrides, and soluble esters of such acids.

3. The elastomer of claim 2 wherein said elastomer includes a minor amount of an antioxidant to inhibit air oxidation.

4. The elastomer of claim 2 wherein said polyfunctional acid material is a combination of a polycarboxylic anhydride and an ortho-phosphoric acid material selected from the group consisting of ortho-phosphoric acid, and the soluble esters thereof.

5. The elastomer of claim 2 wherein said epoxidized polymer has from about 3.5 to about 5.5 weight percent oxirane oxygen.

6. A solid, rubbery, solvent resistant elastomer comprising the cured product of a semi-liquid polymer having a room temperature viscosity of from 20 to about 45,000 poises, said semi-liquid polymer comprising in part by weight (1), a first component of an epoxidized semi-liquid 1,3-diene polymer selected from the group consisting of a homopolymer of a 1,3-diene and a copolymer of a 1,3-diene and up to 50% by weight of a monoethylenically unsaturated comonomer having its sole aliphatic carbon to carbon unsaturation present in a vinyl group, said epoxidized polymer having about 0.4 to 7 weight percent oxirane oxygen, and (2), about 1 part of a second component of the mixture of about 10 parts of an unepoxidized semi-liquid 1,3-diene polymer as defined hereinbefore and from about 1 to 5 parts of a strong, non-oxidizing polyfunctional acid material selected from the group consisting of those non-oxidizing polybasic acids have a minimum dissociation constant for the first hydrogen of at least about $10^{-2}$, the anhydrides, and soluble esters of such acids.

7. The elastomer of claim 6 wherein said polyfunctional acid material is a polycarboxylic acid anhydride.

8. The elastomer of claim 6 wherein said polyfunctional acid material is pyromellitic anhydride.

9. The elastomer of claim 6 wherein said polyfunctional acid material is chloromaleic anhydride.

10. The elastomer of claim 9 wherein said polyfunctional acid material is composed of a major amount of a polycarboxylic acid anhydride and a minor amount of a member of the group selected from orthophosphoric acid, and its soluble esters.

11. A solid rubbery, solvent resistant elastomer comprising the cured product of a semi-liquid polymer having a room temperature viscosity of from 20 to about 45,000 poises, said semi-liquid polymer comprising in parts by weight (1) from 1 to 4 parts of an epoxidized semi-liquid polymer selected from the group consisting of a 1,3-butadiene homopolymer, and a copolymer of 1,3-butadiene and styrene containing up to 50% by weight styrene, said polymer having about 0.4 to 7 weight percent oxirane oxygen and (2) about 1 part of a mixture of about 10 parts by weight of an unepoxidized polymer selected from the group consisting of a 1,3-diene homopolymer and a copolymer of a 1,3-diene and up to 50% by weight of a monoethylenically comonomer having its sole aliphatic carbon to carbon unsaturation present in a vinyl group, and 1 to 5 parts by weight of a strong, non-oxidizing polyfunctional acid material selected from the group consisting of those non-oxidizing, polybasic acids having a minimum dissociation constant for the first hydrogen of at least about $10^{-2}$, the anhydrides, and the soluble esters of such acids.

12. A method of making a semi-liquid elastomer, having a room temperature viscosity in the range of from about 20 to about 45,000 poises, capable of spontaneously curing at room temperature to a solid state, said method comprising combining and thoroughly mixing together in parts by weight (1), a first component of an epoxidized semi-liquid 1,3-diene polymer selected from the group consisting of a homopolymer of a 1,3-diene and a copolymer of a 1,3-diene and up to 50% by weight of a monoethylenically unsaturated comonomer having its sole aliphatic carbon to carbon unsaturation present in a vinyl group, said epoxidized polymer having about 0.4 to 7 weight percent oxirane oxygen, and (2), about 1 part of a second component of the mixture of about 10 parts of an unepoxidized semi-liquid 1,3-diene polymer as defined hereinbefore and from about 1 to 5 parts of a strong, non-oxidizing polyfunctional acid material selected from the group consisting of those non-oxidizing polybasic acids having a minimum dissociation constant for the first hydrogen of at least about $10^{-2}$, the anhydrides, and soluble acid esters thereof.

References Cited in the file of this patent

UNITED STATES PATENTS

| | | |
|---|---|---|
| 1,988,448 | Hopff et al. | Jan. 22, 1935 |
| 2,660,563 | Banes et al. | Nov. 24, 1953 |
| 2,829,130 | Greenspan | Apr. 1, 1958 |

UNITED STATES PATENT OFFICE

CERTIFICATE OF CORRECTION

Patent No. 2,915,494            December 1, 1959

William J. Snoddon

It is hereby certified that error appears in the printed specification of the above numbered patent requiring correction and that the said Letters Patent should read as corrected below.

Column 4, line 4, for "oxitrane" read -- oxirane --; column 6, line 24, for "60:50" read -- 60:40 --.

Signed and sealed this 27th day of September 1960.

(SEAL)
Attest:
KARL H. AXLINE
Attesting Officer

ROBERT C. WATSON
Commissioner of Patents